(12) United States Patent
Kalathil et al.

(10) Patent No.: US 11,468,393 B1
(45) Date of Patent: Oct. 11, 2022

(54) PARCEL DELIVERY SYSTEM AND METHOD

(71) Applicant: Parcelist, Philadelphia, PA (US)

(72) Inventors: Eapen Kalathil, Philadelphia, PA (US); Joseph Gunn, Philadelphia, PA (US)

(*) Notice: Subject to any disclaimer, the term of this patent is extended or adjusted under 35 U.S.C. 154(b) by 384 days.

(21) Appl. No.: 16/596,951

(22) Filed: Oct. 9, 2019

Related U.S. Application Data

(60) Provisional application No. 62/743,120, filed on Oct. 9, 2018.

(51) Int. Cl.
- *G06Q 10/08* (2012.01)
- *G06K 7/14* (2006.01)
- *G07C 9/20* (2020.01)
- *H04N 7/18* (2006.01)
- *G07C 9/00* (2020.01)
- *G07C 9/21* (2020.01)

(52) U.S. Cl.
CPC ....... *G06Q 10/0833* (2013.01); *G06K 7/1413* (2013.01); *G06Q 10/087* (2013.01); *G07C 9/00182* (2013.01); *G07C 9/00571* (2013.01); *G07C 9/00912* (2013.01); *G07C 9/21* (2020.01); *H04N 7/18* (2013.01)

(58) Field of Classification Search
None
See application file for complete search history.

(56) References Cited

U.S. PATENT DOCUMENTS 9,052,992 B2 * 6/2015 Irwin ................. G07F 17/12

* cited by examiner

*Primary Examiner* — Paul Danneman
(74) *Attorney, Agent, or Firm* — Argus Intellectual Enterprise; Daniel Enea; Jordan Sworen

(57) ABSTRACT

A parcel delivery system and method are provided. The parcel delivery system includes a parcel receptacle unit with one or more lockers that securely receives parcels from any commercial carrier and provides for users to retrieve their parcel. The parcel delivery system includes a parcel receiving system that receives a parcel identification code from multiple sources such as a confirmation delivery message, direct from user, automatically scanned codes during delivery, or manually entered codes during delivery or provided during review post-delivery. Upon arrival to a designated receiver, the parcel is processed and the parcel receiving system captures images of the parcel and of an identification code. Once the identification code of the parcel is verified, an available locker is selected based on the detected size of the parcel and opened to receive the parcel. A locker access code is generated and sent to a receiver for retrieval of the parcel.

16 Claims, 8 Drawing Sheets

PARCEL DELIVERY SYSTEM AND METHOD

CROSS REFERENCE TO RELATED APPLICATION

This application is a U.S. nonprovisional utility application claims the benefit of, U.S. provisional application No. 62/743,120 filed on Oct. 9, 2018, and the above identified patent application is herein incorporated by reference in its entirety.

BACKGROUND OF THE INVENTION

The present invention relates to a parcel delivery system and method. More specifically, the present invention relates to a parcel delivery system and method that allows for unsupervised delivery of parcels to users or recipients, either residential or commercial, while matching delivery parcels with users. The parcel delivery system and method ensure that consumers, merchants, and commercial carriers capture and make delivery information available between all parties from the point at which an order is made to the time the order is delivered.

Commercial transactions by the internet have opened tremendous opportunities in the fields of merchandising and parcel delivery. Customers are often able to place an order, arrange for payment and delivery, often without human intervention by the vendor. For example, customers purchase merchandise remotely through an online marketplace, and that merchandise must be delivered to the customer by a commercial carrier. Although online ordering occasionally allows the customer to select a delivery time, place, and manner, most commercial carriers charge an additional fee for these luxury arrangements. Further, these types of delivery services are often not available, more expensive, or interrupted due to unplanned changes in either the commercial carrier or the customer's schedule.

In the vast majority of cases, the delivery location is specified by the customer, but the actual delivery date and time are specified by the commercial carrier. The commercial carrier commonly drops the parcel in an unsecured area near the front entrance of a building, such as near the front porch area of a home or office. However, this practice carries the obvious liability of exposing the merchant, commercial carrier and/or the recipient to the risk that the unsecured parcel may be stolen or possibly damaged by exposure to environmental elements. Retrieval of these delivered parcels adds additional complications for the customer. A parcel that is delivered by commercial carrier may be hidden from the general view by placement behind plants or fences. The onus is now on the customer to search and retrieve the parcel within a limited time to decrease the likelihood of theft or environmental damage, which especially burdens the elderly or the infirm.

In some cases, the commercial carrier finds it necessary to deliver the parcel directly to the recipient or an authorized/supervised agent. However, this is too impractical given the schedule of most customers. This inconveniences both parties as the commercial carrier may need to redeliver merchandise or require the recipient to travel to a designated location for pickup.

One method of parcel delivery to an apartment community now includes using property management staff members. The commercial carrier delivers the parcel to the on-site property management office to be picked up when the resident returns. This requires additional burdens to be placed on property management staff members. Further, the disadvantage for the resident is that the parcel can only be picked-up during office hours. Given the long work hours and alternate work schedules of many residents, restricting parcel pick up during property management office hours can be an inconvenience.

Customers now demand more convenient, safe delivery options that are seamless and flexible with their busy schedules for receiving their online purchases.

At some locations there are automated lockers for certain postal service and other commercial carriers. Unfortunately, these lockers only work for dropping off locker company's packages and do not accept packages from other companies or commercial carriers.

As an attempt to address the lack of a universal locker, there exists an apartment type locker system. However, this locker system is not fully automated and requires the commercial carrier personnel to input the username, address information, special codes, tracking numbers, packages sizes etc. to successfully drop off a parcel. This time-consuming drop off process requires much cooperation/compliance from the commercial carrier personnel. As the additional time and steps required for each delivery increases, the resistance for commercial carrier personnel to follow the required steps necessary for a successful and accurate delivery increases. This resistance further contributes to incorrect information entry and failed deliveries. Also, multiple scenarios for parcel drop off and first-time locker deliveries require onsite supervision to complete a successful drop off for successful pickup by recipient. These known lockers do not address the delivery services' needs to reduce the missed deliveries, concerns with theft, payment considerations, receiver authorizations, and various other concerns. All these solutions, however, inherently contain inefficiencies for the customer, the vendor, and the delivery service.

Moreover, it is presently difficult for commercial carriers to provide information that would allow parcel recipients to accurately identify the location of a parcel during shipment. This is due to the lack of a centralized system, that is readily accessible by users, that accurately updates parcel statuses during the shipment process. Although accurate package delivery information is important to users, this information is usually delayed due to the lack of accurate data on the exact location of a parcel and due to lack of adoption of a common or standardized system by all commercial carriers. The present invention is adapted to notify a user instantly when a parcel is delivered. Further, the present invention enables the users to effectively track multiple packages during shipment with accurate and reliable delivery statuses.

In view of the above concerns, it is desirable to provide an embodiment of the parcel delivery system and method that eliminates the problems of known lockers. The present parcel delivery system and method does not require direct supervision of parcel deliveries, accepts deliveries from any commercial carrier, and minimizes manual entry of much information and unnecessary or additional steps, all while resulting in accurate package drop off. Further, the system can be shared and maintained by several localized buildings to allow more users per system and decrease the cost per user.

In light of the devices disclosed in the known art, it is submitted that the present invention substantially diverges in design elements and methods from the known art and consequently it is clear that there is a need in the art for an improvement for a parcel delivery system and method. In this regard the instant invention substantially fulfills these needs.

SUMMARY OF THE INVENTION

In view of the foregoing disadvantages inherent in the known types of parcel delivery systems now present in the known art. The present invention provides a new parcel delivery system and method wherein the same can be utilized for unsupervised delivery of a parcel from any commercial carrier at a residential community.

It is an objective of the present invention to provide a parcel delivery system and method having over a 99% successful delivery and completion rate using automated solutions and provide ease of delivery for any carrier such that even first time deliveries by a carrier can be made without any prior training.

It is another objective of the present invention to provide a parcel delivery system and method that includes a parcel receptacle unit having one or more lockers configured to accept and house a parcel.

A parcel receiving system having a feedback camera and a visual camera is in electronic communication with a server, wherein the feedback camera configured to capture a real time image of a parcel receiving area and display the real time image on a display screen. The parcel receiving area is configured to receive the parcel and situate the parcel for inspection by the visual camera. The visual camera is configured to capture an identification code of the parcel, and in cooperation with the server verify the identification code. The parcel delivery system is configured to open a target locker of the one or more lockers upon verification of the identification code.

In one embodiment, the parcel delivery order is located in a confirmation delivery message such as an email or text message. The parcel delivery order is transmitted to the server where a parser identifies the relevant information and collects the parcel delivery order from the confirmation delivery message. In another embodiment, the parcel delivery order is manually entered into the parcel receiving system.

In one embodiment, the parcel receiving system further comprises a sensor configured to scan the parcel to determine dimensions for a minimum bounding box for the parcel. The parcel receptacle unit is configured to select the target locker by using dimensions of the minimum bounding box, wherein the target locker includes a smallest dimension of the one or more lockers that is available and sized to accept and house the parcel. The parcel receptacle unit is determined in cooperation with the sensor that determines the dimension of the minimum bounding box for the parcel.

The present invention further provides a method of securing a parcel for delivery and retrieval at a parcel receptacle unit. In one embodiment, the method comprises: receiving a confirmation delivery message having a parcel delivery order from an electronic device; receiving an identification code of the parcel via a parcel receiving system; and opening a target locker of the parcel receptacle unit upon verifying the identification code of the parcel with the parcel delivery order, wherein the target locker is selected from one or more lockers and is dimensioned to receive the parcel It is therefore an object of the present invention to provide a new and improved parcel delivery system and method that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
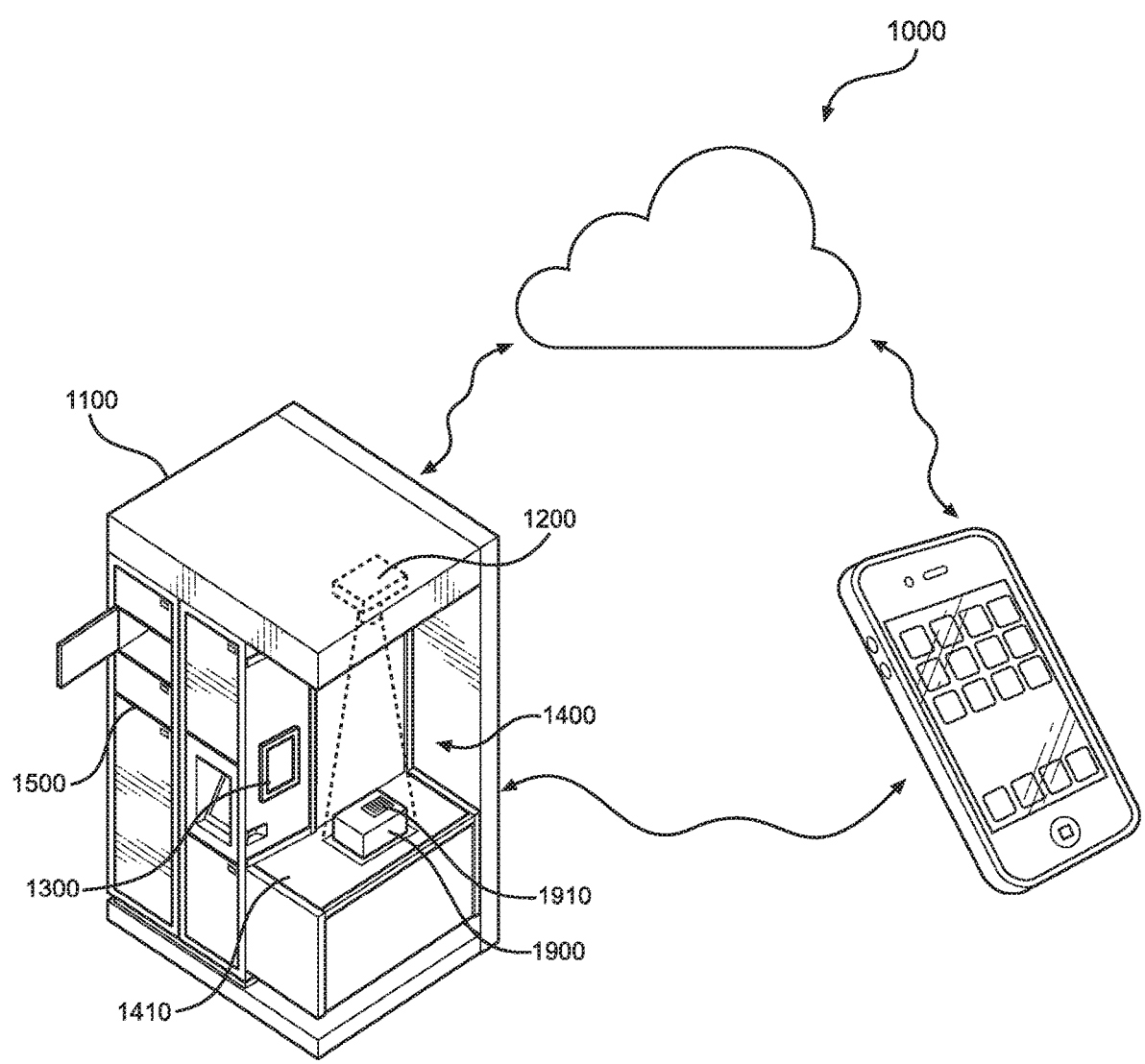
FIG. 1 shows a perspective view of an embodiment of the parcel receiving unit of the parcel delivery system.

Reference is made herein to the attached drawings. Like reference numerals are used throughout the drawings to depict like or similar elements of the parcel delivery system and method. For the purposes of presenting a brief and clear description of the present invention, the preferred embodiment will be discussed as used for delivery of a parcel to an apartment community without property management staff supervising deliveries from any commercial carrier. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

References to "commercial carrier" includes a private or public entity that transports goods from one place to another for a fee and may be used interchangeable with "delivery service". Further, "commercial carrier" is understood to be interchangeable with an individual member of a company or the company tasked with delivering parcels to recipients and is not necessarily limited to the listed description. As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry. References to "display" or "display screen" include any electronic device, such as a computer or tablet having an interactive touchscreen.

Referring now to FIG. 1, there is shown a perspective view of an embodiment of the parcel delivery system. The parcel delivery system 1000 provides a parcel receptacle unit 1100 that is adapted to receive direct delivery items, packages, and parcels 1900 (hereinafter "parcel" or "parcels") at the residence of a user from any commercial carrier and provides an associated system that provides notification of delivery to the user of the time and place of delivery. The parcel receptacle unit 1100 comprises a parcel receiving system 1200 that coordinates the delivery of parcels 1900 and one or more lockers 1150 that are sized and configured to house parcels of varying sizes therein. A parcel receiving area 1400 is located in close proximity to the lockers 1150 and provides a base 1410 that supports the parcel 1900 during the initial stage of delivery at the parcel receptacle unit 1100.

In the illustrated embodiment, the parcel receptacle unit 1100 comprises a first locker, a second locker, a third locker, a fourth locker, and a fifth locker, wherein each locker may be a different dimension. The parcel receptacle unit 1100 is directly joined with the parcel receiving system 1200 to integrate the systems and provide convenience to the commercial carrier and user. In an alternative embodiment, the parcel receptacle unit 1100 is separate from the parcel receiving system 1200.

Figure 2:
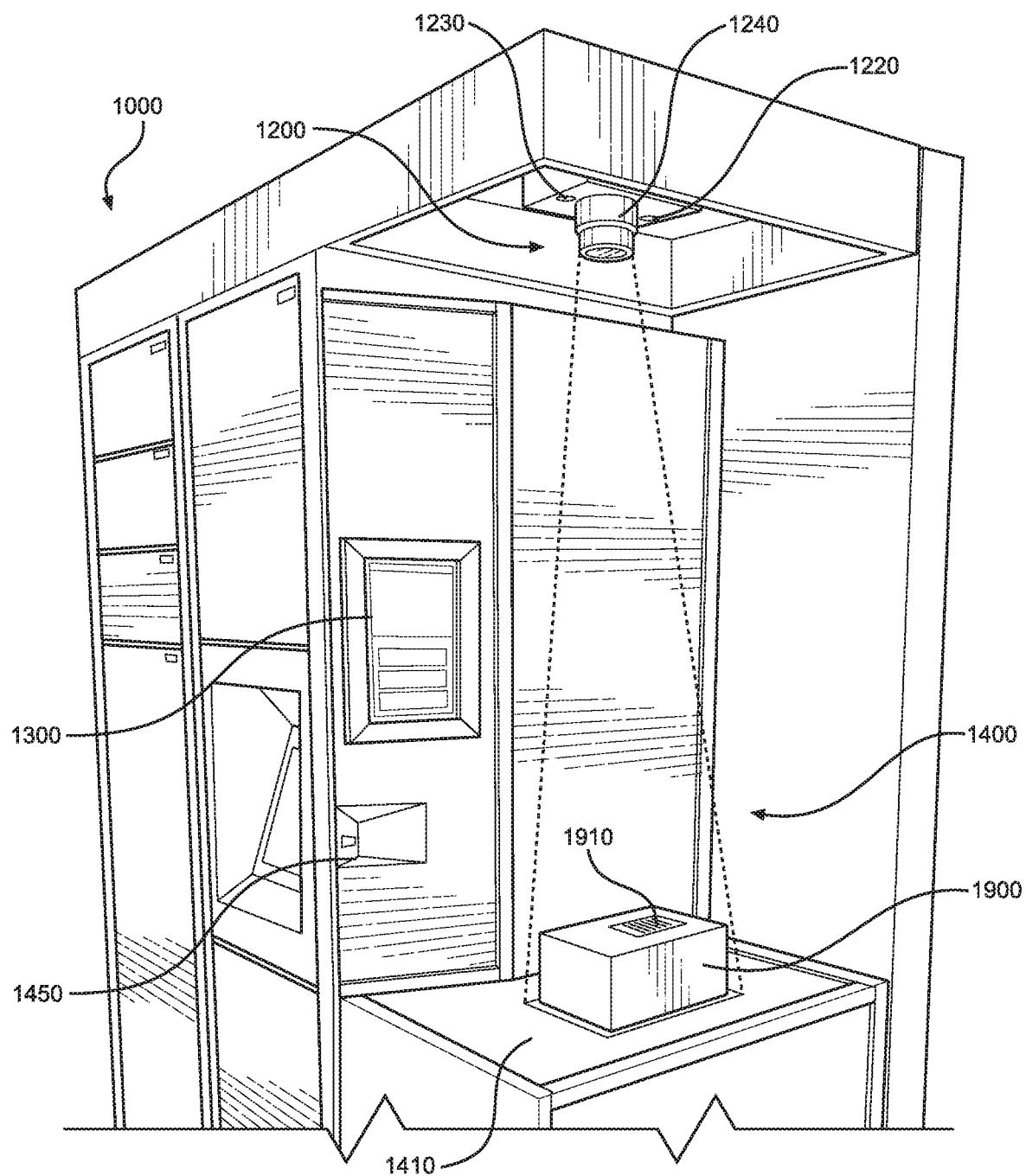
FIG. 2 shows a front-end view of an embodiment of the parcel receiving system and the parcel receiving system of the parcel delivery system.

Referring now to FIG. 2, there is shown a front-end view of an embodiment of the parcel receiving system. In one embodiment, the parcel receiving system 1200 is comprised of a feedback camera 1230 configured to capture real time images of the parcel receiving area 1400, a sensor 1220 adapted to dimension the size of the parcel in the parcel receiving area 1400, and a visual camera 1240 configured to capture an image of the parcel 1900 and an identification code 1910 of the parcel. A display 1300 is positioned in close proximity to the parcel receiving area 1400. In the shown embodiment, the display 1300 is a computer having a touchscreen for both displaying images and receiving input. The parcel receptacle unit 1100 may be disposed at a main entrance to a residence for security and convenience or shared by several buildings as a PO Box for packages.

In the shown embodiment of FIG. 2, the parcel 1900 is positioned on the base 1410 of the parcel receiving area 1400. Once positioned on the base 1410, the feedback camera 1230 captures real time images of the base 1410. The base 1410 includes an area and corresponding perimeter that delineates the viewing boundaries of the feedback camera 1230, the sensor 1220, and the visual camera 1240. In one embodiment, the area of the base 1410 that is within the capturing view of the feedback camera 1230, the sensor 1220, and the visual camera 1240 is indicated by an indicator, such as a line, on the base 1410. In alternative embodiments, the area of the base 1410 that is within the capturing view of the feedback camera 1230, the sensor 1220, and the visual camera 1240 is indicated by a digital overlay when shown on the display 1300. For example, if the parcel 1900 is positioned outside the base 1410, the parcel receiving system 1000 will indicate the need to reposition the parcel 1900.

Once positioned within the base 1410, the visual camera 1240 captures the identification code 1910 of the parcel 1900. The identification code 1910 may include information such as name of the user, name of the item ordered, date of order placed, parcel ID, tracking number, user code, barcode, possible date of delivery and possible time of delivery. The identification code 1910 is verified through a parcel verification system and method (as shown in FIGS. 4-6C). In one embodiment, the feedback camera and the visual camera are the same camera system configured for capturing configured to capture images of the parcel receiving area 1400 and to capture an image of the parcel 1900 and an identification code 1910 of the parcel. In the shown embodiment, the feedback camera 1230 and the visual camera 1240 are distinct cameras.

The parcel receiving system 1200 determines the size of the parcel 1900 positioned on the base 1410. In one embodiment, the sensor 1220 scans the size of the parcel 1900 by producing a map of the distance from a plane of the sensor 1220 to a plane of the base 1410 and scans the surroundings of the parcel 1900 which enables the calculation of the size of the minimum bounding box for parcel 1900 placed on the base 1410 and displays the scanned information on the display 1300 of the parcel receptacle unit 1100. In this way, the parcel receiving system 1200 assists with the locker selection based on the size characteristics of each parcel.

Figure 3:
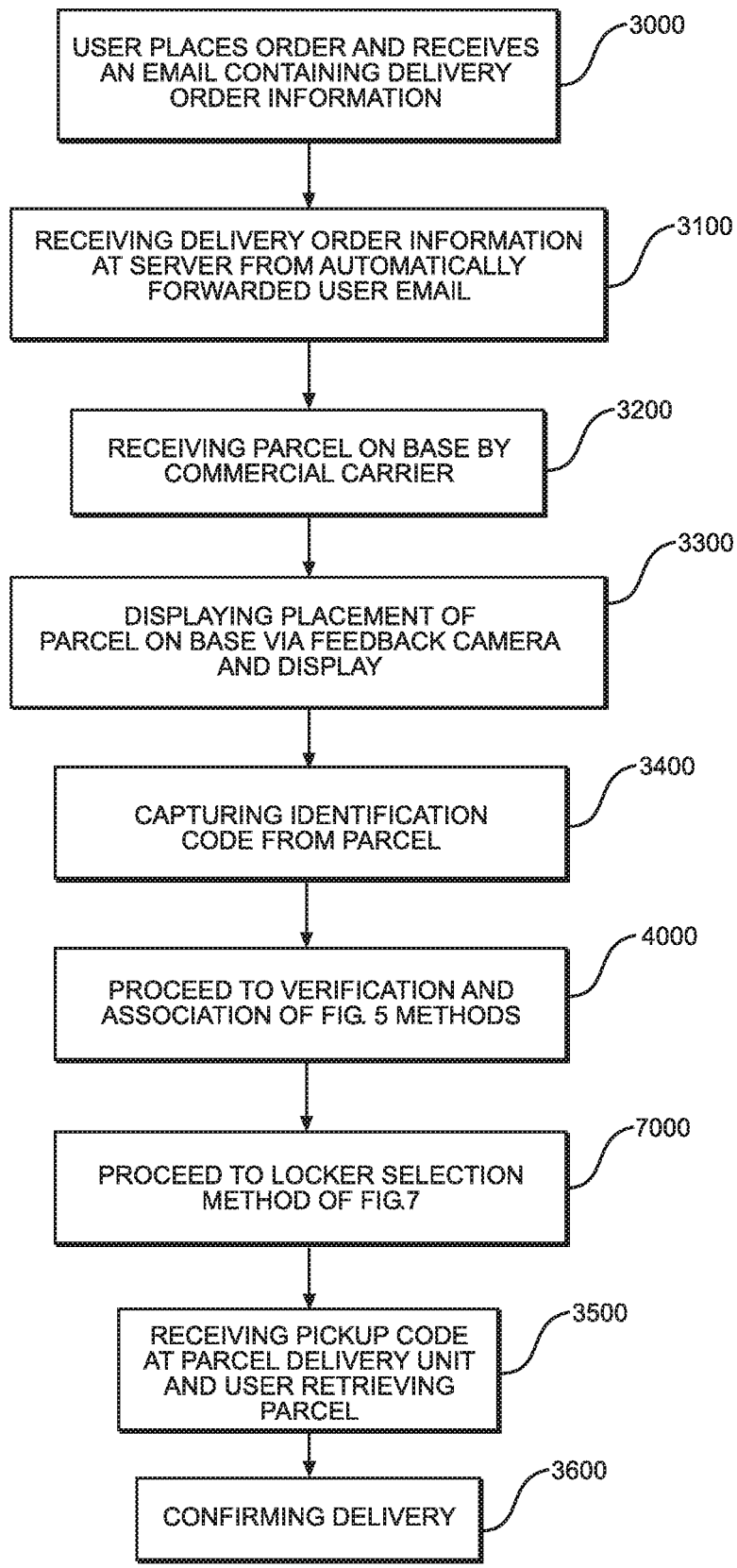
FIG. 3 shows a flowchart one embodiment of a method of securing a parcel for delivery and retrieval at a parcel receptacle unit of the parcel delivery system.

Referring specifically to FIG. 3, there is shown a flowchart one embodiment of a method of securing a parcel for delivery and retrieval at a parcel receptacle unit of the parcel delivery system. In the shown embodiment, the user is the intended recipient of the parcel being delivered by the commercial carrier. Prior to placement of an order for a good, the user has associated with the parcel delivery system by providing a valid email address, phone or text number, or other contact information that is adapted to receive delivery order information. Further, the user has a corresponding username and password associated with the delivery system. In one exemplary embodiment, the user places an order online receives an email containing parcel delivery order information 3000 either when that order is shipped or prior to the shipment. The delivery order information is transmitted to the server of the parcel delivery system 3100 manually or automatically, from the user's email by using an email add-on that transmits each user's commercial carrier email notifications to the server.

In one embodiment, the parcel delivery system parses the email and extracts relevant parcel delivery information required for associating the parcel to the user. The parcel delivery information includes details such as name of the user, name of the item ordered, date of order placed, parcel ID, tracking number, user code, any identifying barcodes, possible date of delivery and possible time of delivery. In one embodiment, the user inputs the tracking number into the parcel delivery system before or after delivery to associate the parcel. The parcel delivery information is stored in the server of the parcel delivery system. The server is either located local to the parcel delivery unit, remotely, or in a cloud. Therefore, the parcel delivery information is transmitted from the user's email to parcel delivery system which then enables the parcel delivery system to associate a particular parcel to its intended recipient/user automatically, once the parcel identification code, such as the tracking number, is provided to the parcel delivery unit.

When delivering the parcel at the location of the parcel delivery unit in FIG. 3, the commercial carrier initially places the parcel on the base of the parcel delivery unit 3200. The placement of the parcel is such that it is placed on the parcel receiving area which is indicated on the base for properly scanning the parcel via the parcel receiving system. The parcel receiving system captures and displays the parcel via the feedback camera and the display 3300. The parcel placed on the base of the parcel delivery system is scanned in real-time by the feedback camera and displays the placement of the parcel and the identification code of the parcel, thereby enabling the other components, such as the visual camera, to properly capture the identification code of the parcel. Therefore, the commercial carrier may view the placement of the parcel and the identification code on the display screen and selectively correct the placement if required.

The visual camera captures the identification code of the parcel by taking a high-resolution image of the parcel placed on the base 3400, or the label of the parcel. In particular, the visual camera captures the parcel label to detect the presence of the identification code thereon, thereby allowing for associating with the parcel recipient. The present parcel receiving system allows for delivery by any common carrier and provides for increased accuracy of association while minimizing or removing manual input from the commercial carrier. Hereinafter, references to capturing images of the "parcel", "identification code of the parcel" and the like includes capturing the label of the parcel where such parcel information is commonly found. The parcel receiving system processes the captured image and identifies identification code information of the parcel. If the parcel receiving system captures the identification code, then the system associates and verifies the parcel with the user 4000 via the various methods of FIG. 5. In the shown embodiments of FIGS. 6A-6C, there are several association methods that are used, in sequence or simultaneously to ensure the parcel is associated with one of the users in an effort to achieve a high accuracy rate of association. Once the parcel has been associated with a user, the parcel delivery unit determines the target locker for storage therein via a Locker Selection Method 7000, as shown in FIG. 7. Upon the target locker receiving the parcel, the parcel delivery unit generates and sends an access or pickup code to the user 3500. At the convenience of the recipient, the parcel is retrieved by entering the pickup code at the parcel delivery unit. In one embodiment, confirmation message is generated 3600 and may be sent to the recipient, the commercial carrier, and/or the merchant confirming pickup.

Figure 4:
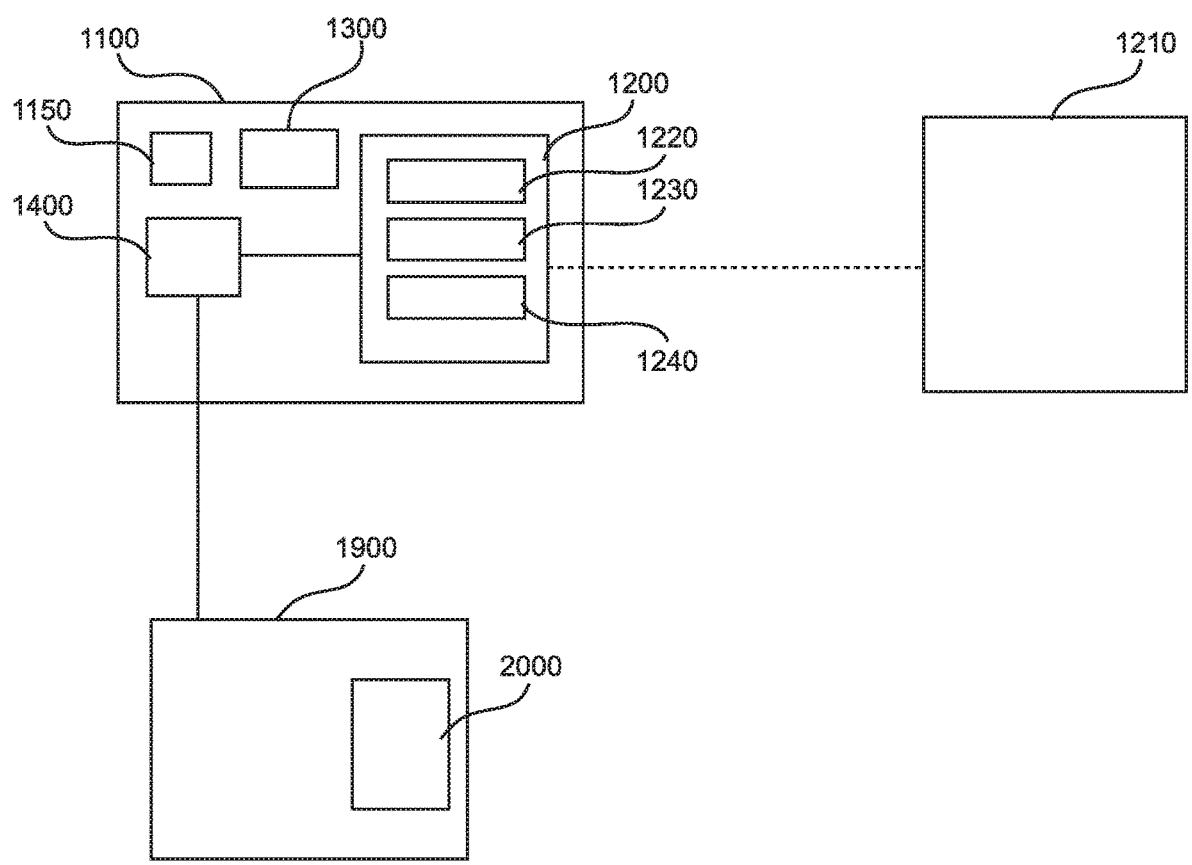
FIG. 4 shows a block diagram of one embodiment of the parcel delivery system.
Figure 5:
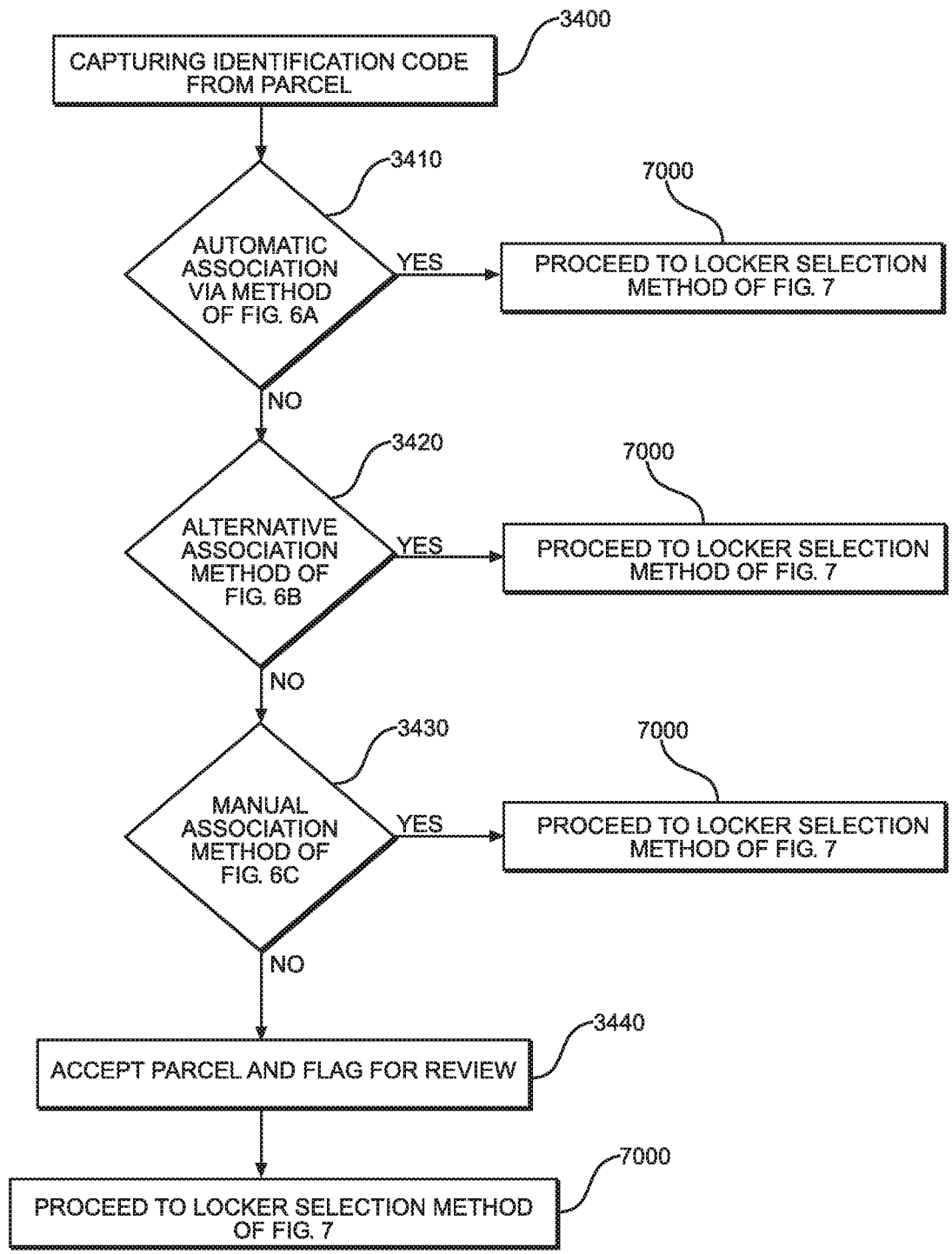
FIG. 5 shows a flowchart of one embodiment of various parcel verification and association methods of the parcel delivery system.

Referring now to FIGS. 4 and 5, there is shown a block diagram of one embodiment of the parcel delivery system and a flowchart one embodiment of a method of the parcel verification and various association methods, respectively. As shown in the embodiment of FIG. 4, the parcel delivery unit 1100 is in electronic communication with a server 1210 and an electronic device of the user, such as a personal computer, cell phone, tablet, and the like, wherein the electronic device is adapted to place online orders. The parcel delivery order information is transmitted to the email of the user's electronic device after the parcel 1900 is shipped. The server 1210 for the parcel delivery system is operably connected to the electronic device of the user and receives the parcel delivery order information. A parser parses the email and extracts relevant delivery order information containing identification code required for associating the parcel to the user. The parcel delivery order is stored in non-transitory memory of the server 1210.

In one embodiment, the parcel receiving system, including the feedback camera 1230, is operably connected to the server 1210. The captured identification code 2000 of the parcel 1900 from the feedback camera 1230 is transmitted to the server 1210 and is displayed on the display screen 1300 to enable the commercial carrier to view the placement of the parcel 1900 and the parcel label 1910 on the display screen 1300 and correct the placement if required. The visual camera 1240 is operably connected to the server 1210. The visual camera 1240 captures a high-resolution image of the parcel 1900 to obtain the identification code 2000, which is transmitted to the server 1210 for verification. The server 1210 compares the identification code with the already stored delivery order information. When the verification of the parcel 1900 is confirmed, a target locker selected from the plurality of lockers 1150 is opened. The sensor 1220 of the parcel delivery unit 1100 calculates the minimum bounding box size of the received parcel 1900 and the target locker 1150 is selected, wherein the target locker 1150 is the smallest available empty locker dimensioned to house the parcel 1900. After successful verification, the server 1210 causes an opener of the locker 1150 to open for parcel 1900 delivery. If the parcel is delivered, the parcel delivery unit 1100 confirms the delivery of the parcel 1900. In a situation when the parcel 1900 cannot be verified, the commercial carrier manually scans or otherwise enters the identification code 2000 of the parcel 1900 for verification.

Referring specifically to FIG. 5, the shown embodiment of various parcel verification and association methods provides for the comparing and verifying of the identification code captured at the parcel delivery unit with the delivery order information stored on the server. There are several methods of capturing the identification code of the parcel 3400. Among the various ways of capturing the identification code, include, but is not limited to the Automatic Association Method 3410, the Alternative Association Method 3420, and the Manual Association Method 3430. If any of these association methods 3410, 3420, 3430 allow for association, then the carrier moves to the Locker Selection Method 7000. If these associations methods 3410, 3420, 3430 fails to verify, the parcel is still accepted 3440 and flagged for review by an administrator. In one embodiment, the parcel delivery order may be processed subsequent the delivery, and accepting the parcel thereby permits association after the delivery. The information code of the parcel is transmitted to the server for comparing with the already stored delivery order information. The compared information enables the parcel delivery system to determine the association of the parcel 1900 with the user. Upon successful association, a target locker is selected from the one or more lockers of the parcel delivery unit via the Locker Selection Method 7000, as shown in FIG. 7. If the server is unable to verify, the parcel delivery system attempts the next or different association method using other information gathered from parcel identification code. Lack of association with either the Automatic Association or the Alternative Association Method allows for the manual entry of the identification code via a Manual Association Method that provides for an additional capture of the identification code or a manual entry thereof.

Figure 6A:
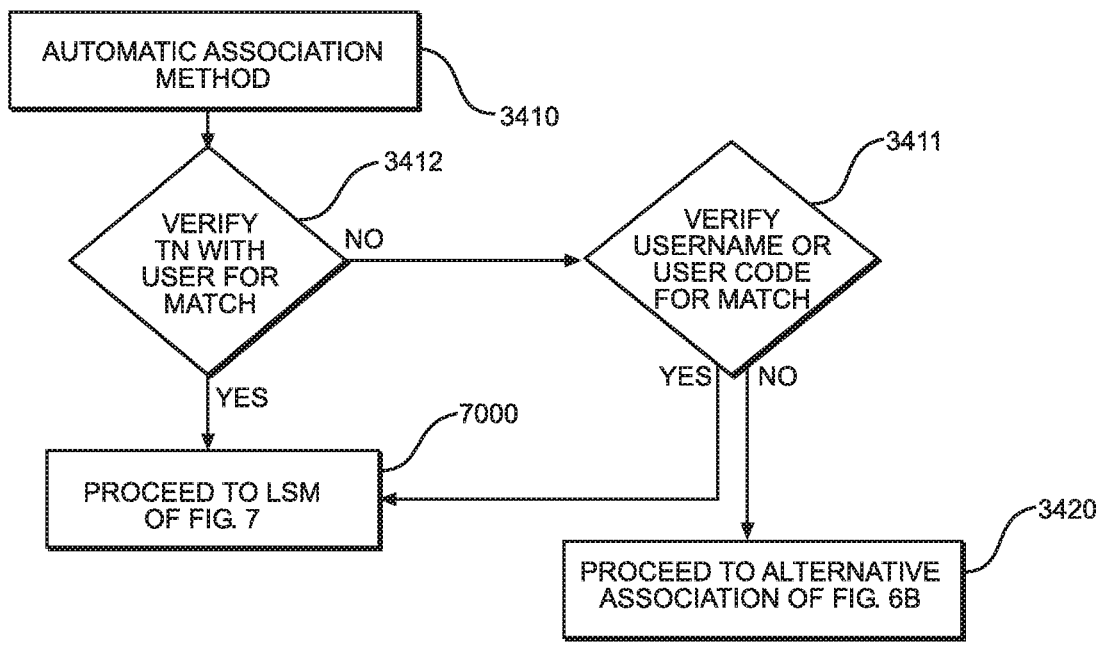
FIG. 6A shows a flowchart of one embodiment of an Automatic Association Method of associating the parcel with the user of the parcel delivery system.
Figure 6B:
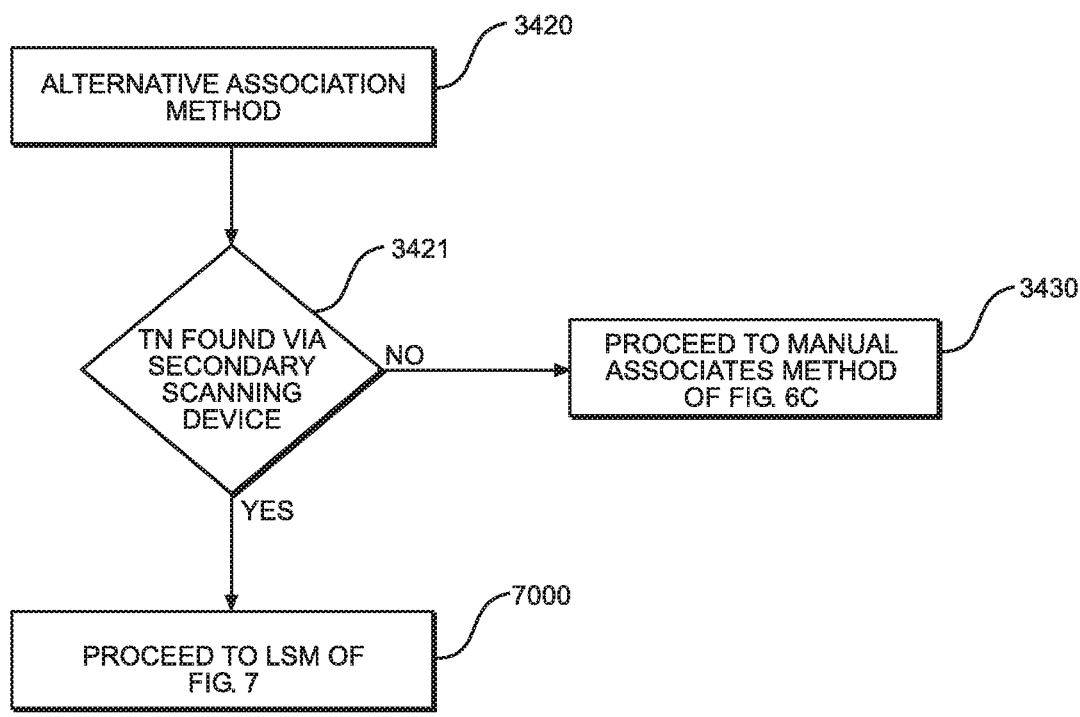
FIG. 6B shows a flowchart of one embodiment of an Alternative Association Method of associating the parcel with the user of the parcel delivery system.
Figure 6C:
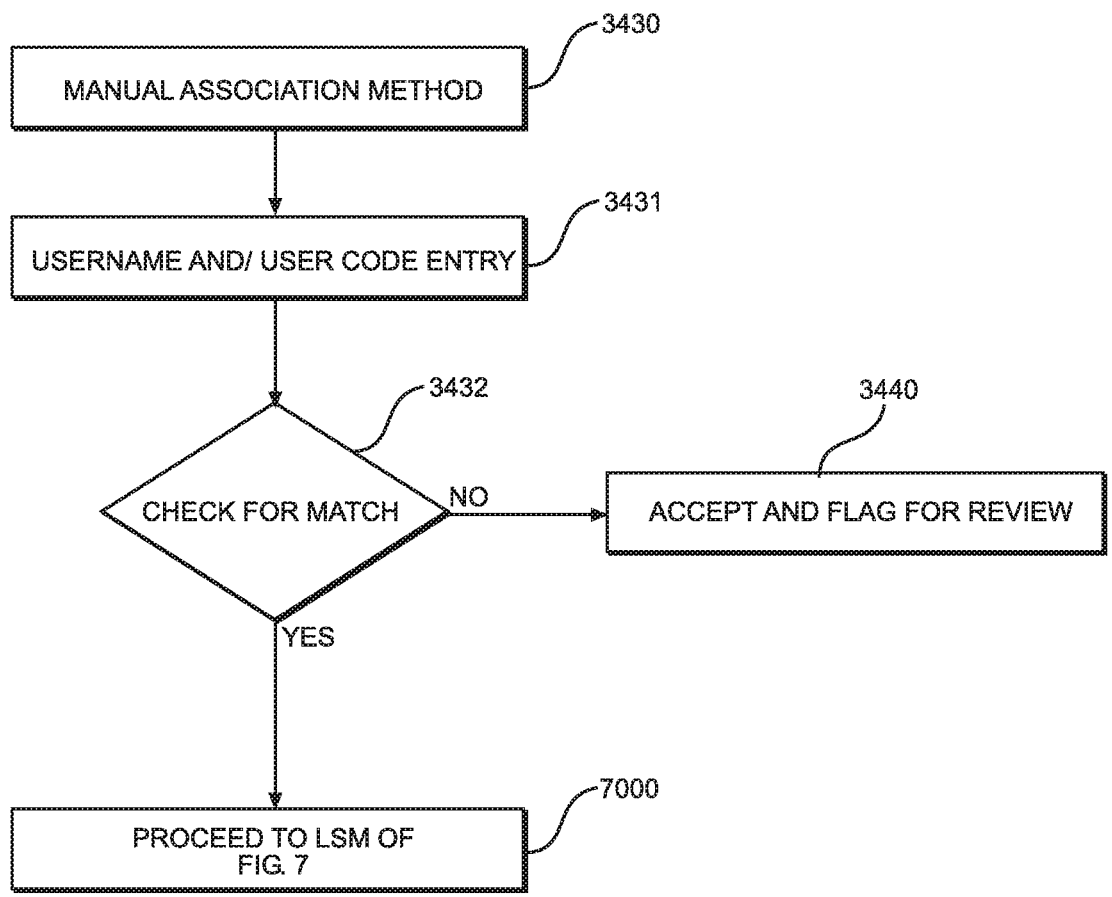
FIG. 6C shows a flowchart of one embodiment of a Manual Method of associating the parcel with the user of the parcel delivery system.
Figure 7:
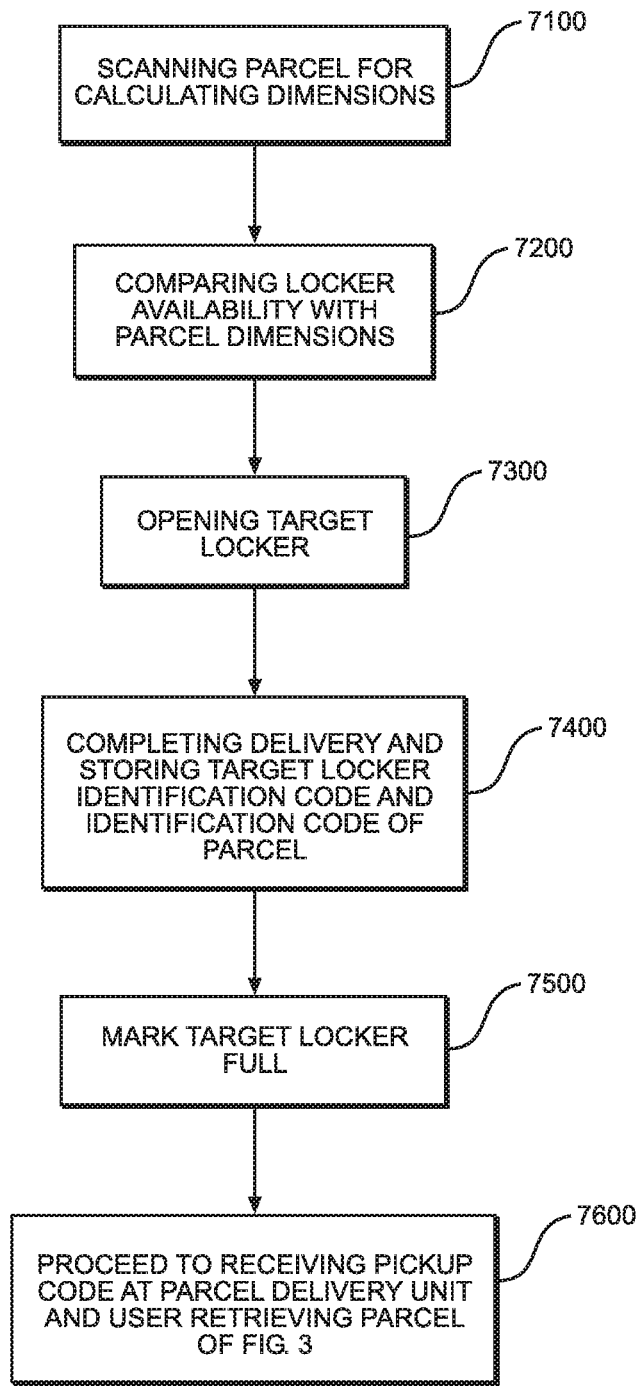
FIG. 7 shows a flowchart of one embodiment of a locker selection method of the parcel delivery system.

Referring now to FIG. 6A-6C, there is shown various flowcharts embodiments of a method of associating the parcel with the user of the parcel delivery system. In the shown embodiments, the method of associating the parcel with the user of the parcel delivery system involves three different association methods: Automatic Association, Alternative Association, and Manual Association. In the illustrated embodiment, the Automatic Association of FIG. 6A comprises both a Primary Automatic Association Method and a Secondary Automatic Association Method, wherein the Secondary Automatic Association Method is executed only when the Primary Automatic Association Method fails. The Primary Automatic Association Method utilizes the visual camera to capture and verify the tracking number 3412 on the parcel to a tracking number associated in the system with a user prior to delivery. If the tracking number cannot be verified or associated with a user, then the system captures the User name and/or User code for verification in the Secondary Automatic Association 3411. The Secondary Automatic Association attempts to verify the User Name, and/or User Code from data collected from the parcel. When placing the original parcel order, each user utilizes a standard addressing format when addressing their parcels to locker. This enables the system's algorithms to identify and verify the User name and User Code for each user.

In the illustrated embodiment, the tracking number capture is the target of a first scan of the parcel and has priority over the User Name and User Code. The tracking number, such as a bar code, is easily identified by pattern recognition software. The User Name and User Code are identified after the scan for the tracking number because the User Name and User Code are generally alphanumerical characters that require optical character recognition. This procedure of first identifying the tracking number provides increased delivery accuracy.

If the tracking number is verified by the visual camera 3412, then the delivery can proceed to the Locker Selection Method 7000 of FIG. 7. In the illustrated embodiment of FIG. 6A, in order for the User Code/User Name 3411 to be verified, the system must suggest a high level of confidence for making an association between data obtained from the visual scan compared to the collected data for each active user. The present system is adapted to compare the data obtained from the visual scan to the collected data at the time of registration for each active user via multiple steps of verification. In one embodiment, algorithms, evaluate the likely probability for matching the information obtained to an active user in the system and select the recipient user if the algorithm suggests high level of confidence for making the association. In the event when the algorithm fails to reach or surpass a threshold value of confidence, the system proceeds to the Alternative Association Method of FIG. 6B and the Manual Association Method of FIG. 6C if needed.

In the shown embodiment of FIG. 6B, the Alternative Association Method utilizes a secondary scanning device (1450 as shown in FIG. 2), such as a fixed barcode scanner. If the Automatic Association Method fails to associate a user to the parcel, then the parcel delivery system uses the Alternative Association Method. The secondary scanning device requires the commercial carrier to position the Identification Code of the parcel therewith. If the tracking number is found by the secondary scanner and can be verified to an existing user tracking number in the system, then the delivery can proceed to the Locker Selection Method 7000.

In the shown embodiment of FIG. 6C, the Manual Association Method utilizes the display screen to manually input or select the tracking number, User Name, and/or user code of the parcel. In the illustrated embodiment, the Manual Association Method provides for the association of the parcel to the user when the Automatic and Alternative Association Methods fails to verify the identification code with the delivery order information. In the Manual Association method, the delivery person can provide any or all of the three pieces of information necessary for the system: Tracking number, User Name and User code. As the algorithms of the Automatic Association Method improve, through iterative usage for example, the automatic association method rate will increase and reduce the need for Alternative and Manual Association Methods.

In one exemplary use, John Doe places an order online for apparel through an e-commerce marketplace. John Doe is a tenant at a residential community and has joined the parcel delivery system as an active user. During the initial intake of John Doe into the parcel delivery system, John Doe provides a valid address and email address, and provides associated access to the emails sent and delivered therefrom. In one embodiment the parcel delivery system also generates and assigns John Doe a User Name and User Code. For example, the User Name is "John Doe" and the User Code is "ONVVAG". After some time, the commercial carrier attempts delivery of the parcel to John Doe at the parcel delivery unit. Unfortunately, during the delivery the Automatic and Alternative Association Method both fail to capture the tracking number, User Name, or user code as a result of damage to the label of the parcel. The parcel delivery unit now executes the Manual Association Method. During the Manual Association Method, the commercial carrier selects John Doe as the User Name of the intended parcel recipient from the display of the parcel delivery unit. In one embodiment, the commercial carrier selects John Doe from a dropdown menu that is filtered by manual inputs from the commercial carrier into the system. The commercial carrier is now prompted to input the user code of the intended parcel recipient from the display of the parcel delivery unit. The user code "ONVVAG" is used as an additional address element by John Doe when placing the original order. As such, the parcel label provides the commercial carrier with the User Code "ONVVAG", wherein the commercial carrier selects "ONVVAG" from the display. The User Name and User Code match the same user "John Doe." thus allowing for the delivery to proceed to the next step.

Alternatively, if the User Name of the intended parcel recipient ("John Doe.") is not found during Manual Association Method, then the commercial carrier may manually enter the User Name. The delivery may be flagged for review by an administrator of the parcel delivery system and/or allowed for the delivery to proceed to the next step.

Alternatively, if the user code of the intended parcel recipient ("ONVVAG") is not found during Manual Association Method, then the commercial carrier may manually enter the User Code. The delivery may be flagged for review by an administrator of the parcel delivery system and/or allowed for the delivery to proceed to the next step.

Alternatively, if the User Name and User Code of the intended parcel recipient do not match during Manual Association Method, then delivery may be flagged for review by an administrator of the parcel delivery system and/or allowed for the delivery to proceed to the next step.

Referring now to FIG. 7, there is shown a flowchart of one embodiment of a locker selection method of the parcel delivery system. The locker selection method provides for the identification of the target locker sized to house the parcel until retrieval by the user. Once the parcel has been verified and associated with a user, the parcel delivery unit determines the appropriate locker from the one or more available lockers.

The sensor scans the parcel to determine the size and shape thereof 7100. The sensor scans the parcel and produces a map of the distance from the plane of the sensor to the plane of the base. The sensor also scans the surroundings of the parcel which enables the calculation of the size of the minimum bounding box for the parcel. If the size of the parcel is determined to be less than the size of an available target locker 7200, the target locker opens such that the commercial carrier places the parcel inside the target locker 7300. After the parcel is placed inside the target locker, the commercial carrier closes the locker door. The target locker and corresponding locker identification code is marked "full" and the parcel identification is associated with that locker 7400. In the illustrated embodiment, a full locker is no longer available as a target locker. Afterwards, a confirmation of delivery is stored on the server and communicated to the user 7500. A pickup code is generated and sent to the user for retrieval of the parcel 7600. The pickup code may be a barcode or other identification code that when entered to the parcel delivery unit, causes the target locker to open.

In one embodiment, the parcel delivery system includes a server 1210, non-transitory memory, a logic stored in the memory that, when executed by a processor, causes the delivery system to perform a method, the method comprising: parsing an email for a parcel delivery order, capturing an identification code of a parcel, and opening a target locker of a parcel receptacle unit upon verifying the identification code of the parcel with the parcel delivery order.

In one embodiment, the parcel delivery system provides a method of securing a parcel for delivery and retrieval at a parcel receptacle unit, the method comprising receiving a confirmation delivery message having a parcel delivery order from an electronic device; receiving an identification code of the parcel via a parcel receiving system; opening a target locker of the parcel receptacle unit upon verifying the identification code of the parcel with the parcel delivery order, wherein the target locker is selected from one or more lockers and is dimensioned to receive the parcel.

In another embodiment, the parcel receiving system comprising a visual camera configured to capture the identification code of the parcel positioned on a parcel receiving area of the parcel receptacle unit. Further, the parcel receiving system is configured to receive the identification code via manual entry upon failure of the visual camera to capture the identification code.

In yet another embodiment, the method of the present invention further comprises the parcel receiving system that further includes a feedback camera configured to capture a real time image of the parcel receiving area and display the real time image on a display screen. This enables the proper positioning of the label and parcel during delivery in the field of view of the visual camera.

In another embodiment, the method of the present invention comprises the parcel receiving system that includes a sensor configured to scan the parcel to determine the dimensions of the minimum bounding box of the parcel. The sensor is positioned in a known location and has a field of view directed at the base. When the parcel is positioned on the base, the sensor calculates the relative position of the parcel along at least three dimensions to obtain the size for a minimum bounding box for the parcel.

In another embodiment, the method of the present invention further comprises generating and sending a locker access code the electronic device, the locker access code configured to provide access to retrieve the parcel within the target locker.

In yet another embodiment, the method of the present invention further comprises automatically opening the target locker upon receiving the locker access code.

In another embodiment, the method of the present invention further comprises generating and sending a confirmation message to the electronic device of a completed delivery and retrieval.

In yet another embodiment, the method of the present invention further comprises scanning the confirmation delivery message for the parcel delivery order via a parser.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A parcel delivery system for receiving and storing a parcel, the system in communication with a server, comprising:
    a parcel receptacle unit having a parcel receiving area and one or more lockers, each locker configured to accept and house a parcel;
    a parcel receiving system comprising a visual camera, wherein the visual camera is configured to capture an identification code of the parcel in the parcel receiving area and within an image capture area of the visual camera;
    wherein the parcel delivery system is configured to open a target locker of the one or more lockers upon verification of the identification code;
    a feedback system comprising a feedback camera configured to capture a feedback image of the parcel disposed in the parcel receiving area and display the feedback image on a display screen;
    wherein display of the feedback image via the display screen is adapted to provide feedback of the placement of the parcel within the parcel receiving area in relation to the image capture area of the visual camera such that the visual camera accurately captures the identification code of the parcel.

2. The parcel delivery system of claim 1, wherein the identification code is located in a confirmation delivery message received by the server or transmitted to a recipient of the parcel.

3. The parcel delivery system of claim 2, wherein a parcel delivery order is electronically transmitted to the server before a delivery of the parcel to the parcel receptacle unit.

4. The parcel delivery system of claim 1, wherein a parser is configured to identify and collect the identification code of a parcel delivery order associated with the parcel, where the parcel delivery order is parsed from a confirmation delivery message received by the server.

5. The parcel delivery system of claim 1, wherein the parcel receptacle unit comprises a sensor configured to scan the parcel positioned on a base of the parcel receiving area to determine dimensions of a minimum bounding box of the parcel by calculating a relative position of the parcel from the sensor, wherein the sensor is positioned in a known location from the base, wherein the feedback camera is adapted to provide feedback of the placement of the parcel in the receiving area relative to the image capture area of the visual camera and the sensor such that the sensor accurately captures the minimum bounding box of the parcel.

6. The parcel delivery system of claim 5, wherein the parcel receptacle unit is configured to automatically select the target locker upon determining the minimum bounding box size of the parcel.

7. The parcel delivery system of claim 6, wherein the target locker includes a smallest dimension of the one or more lockers that is available and sized to accept and house the parcel.

8. The parcel delivery system of claim 5, wherein the feedback system provides a digital overlay of the image capture area of the visual camera via the display such that a user may selectively reposition the parcel for capture by the visual camera.

9. The parcel delivery system of claim 8, wherein the sensor and the visual camera are disposed overhead of the parcel receiving area.

10. A method of securing a parcel for delivery and retrieval at a parcel receptacle unit, the method comprising:
receiving an identification code of the parcel via a parcel receiving system;
opening a target locker of the parcel receptacle unit via a Locker Selection Method upon verifying the identification code of the parcel with a parcel delivery order, wherein the Locker Selection Method selects the target locker from one or more lockers based on dimensions of the target locker and the parcel, wherein a sensor scans the parcel to determine a dimension for the minimum bounding box of the parcel;
wherein the parcel receiving unit comprises a feedback system having a feedback camera configured to capture a feedback image of the parcel disposed in the parcel receiving area and display the feedback image on a display screen;
wherein display of the feedback image via the display screen is adapted to provide feedback of the placement of the parcel within the parcel receiving area in relation to the image capture area of the visual camera such that the visual camera accurately captures the identification code of the parcel.

11. The method of securing the parcel for delivery and retrieval of claim 10, further comprising:
associating the parcel with a user via an Automatic Association Method, wherein the Automatic Association Method comprises:
capturing a tracking number of the parcel positioned on a parcel receiving area of the parcel receptacle unit via the visual camera.

12. The method of securing the parcel for delivery and retrieval of claim 11, wherein the Automatic Association Method further comprises:
capturing a user name or user code of the parcel positioned on a parcel receiving area of the parcel receptacle unit via the visual camera.

13. The method of securing the parcel for delivery and retrieval of claim 10, further comprising:
attempting to associate the parcel with a user via an Automatic Association Method, wherein the Automatic Association Method comprises capturing an identification code of the parcel positioned on a parcel receiving area of the parcel receptacle unit via the visual camera;
attempting to associate the parcel with a user via an Alternative Association Method upon failure to associate the parcel with a user via an Automatic Association Method, wherein the Alternative Association Method comprises capturing a tracking number of the parcel using a fixed manual barcode scanner;
attempting to associate the parcel with a user via a Manual Association Method upon failure to associate the parcel with a user via the Alternative Association Method, wherein the Manual Association Method comprises receiving a tracking number, user name, or user code of the parcel via manual entry.

14. The method of securing the parcel for delivery and retrieval of claim 10, further comprising:
generating and sending a locker access code to an electronic device of a user, the locker access code configured to provide access to retrieve the parcel from the target locker.

15. The method of securing the parcel for delivery and retrieval of claim 14, further comprising:
opening the target locker upon receiving the locker access code for pickup of the parcel by a user.

16. The method of securing the parcel for delivery and retrieval of claim 10, further comprising:
associating the parcel with a user by the identification code directly into the parcel delivery system, wherein the parcel delivery system is adapted to associate and claim the delivered and associated parcel and is configured to generate a locker access code allowing the user to pick up the delivered parcel.

* * * * *